United States Patent [19]

Hums et al.

[11] Patent Number: 5,788,761
[45] Date of Patent: Aug. 4, 1998

[54] PROCESS FOR THE MANUFACTURE OF CONSTRUCTION MATERIALS

[75] Inventors: Dieter Hums; Klaus F. Lippe, both of Schrobenhausen, Germany

[73] Assignee: Ytong Aktiengesellschaft, Germany

[21] Appl. No.: 730,551

[22] Filed: Oct. 15, 1996

[30] Foreign Application Priority Data

May 13, 1996 [DE] Germany ............... 196 19 263.3

[51] Int. Cl.$^6$ .................. C04B 22/00; C04B 7/00; C04B 7/345

[52] U.S. Cl. .................. 106/695; 106/672; 106/680; 106/735; 106/772; 106/792; 106/799; 106/820; 264/299; 264/349

[58] Field of Search .................. 106/672, 680, 106/735, 772, 792, 795, 820, 695, 799; 264/299, 349

[56] References Cited

U.S. PATENT DOCUMENTS

| | | | |
|---|---|---|---|
| 4,082,561 | 4/1978 | Nakagawa et al. | 106/695 |
| 4,419,136 | 12/1983 | Rice | 106/695 |
| 4,655,979 | 4/1987 | Nakano et al. | 106/677 |
| 4,769,077 | 9/1988 | Crocker | 106/695 |
| 5,114,487 | 5/1992 | Gartshore et al. | 106/695 |
| 5,234,497 | 8/1993 | Crocker | 106/695 |

FOREIGN PATENT DOCUMENTS

| | | |
|---|---|---|
| 390052 | 8/1989 | Austria . |
| 2709858 | 9/1978 | Germany . |
| 2739181 | 3/1979 | Germany . |
| 4427661 | 2/1995 | Germany . |
| 4418310 | 11/1995 | Germany . |

*Primary Examiner*—Michael Marcheschi
*Attorney, Agent, or Firm*—Jones & Askew

[57] ABSTRACT

A process in which the conventional sulfate components in an aerated concrete mixture, such as gypsum, semihydrate or anhydrite, are replaced at least in part by calcium aluminum sulfates and/or calcium aluminate sulfate hydrates. As a result, agglomeration of the lime, retardation of the lime hydration, and aftergrowth of the cut aerated concrete cakes are reduced or even ruled out. In addition, the number of molds used can be reduced with the process in accordance with the invention, whereby the use of one single mold is achievable.

25 Claims, No Drawings

PROCESS FOR THE MANUFACTURE OF CONSTRUCTION MATERIALS

The invention pertains to a process for the manufacture of construction materials, whereby these construction materials are aerated concrete or gas concrete, in particular.

In order to manufacture aerated concrete products, an aerated concrete composition that comprises the finely ground components sand, lime, cement, a sulfate component and water, is usually mixed and then poured into molds, whereby the aerated concrete composition is made to form a foam via suitable agents. A known possibility for forming a foam in an aerated concrete mixture comprises the dispersion of aluminum powder into the aerated concrete mixture; this then reacts with the $OH^-$ ions produced by the reaction of quicklime with water, whereby hydrogen is liberated. The liberated hydrogen allow the aerated concrete mixture to swell. This process is also designated the foaming and setting process.

The aerated concrete composition then sets in the molds, hereby the pores achieved as a result of foam formation remain intact.

The obtained aerated concrete cake with green strength is then removed from the mold and cut into the desired formats for the final product using suitable devices. The cut aerated concrete cakes are submitted to steam hardening in an autoclave in a known manner. "Green strength" means the strength of the product after foaming and setting of the concrete and before the product is hardened in an autoclave. After steam hardening, the finished aerated concrete products can be packaged and dispatched.

Calcium sulfates are added to the mixture during the manufacture of such aerated concrete products. The objective of this calcium sulfate addition is to increase the crystallinity of the aerated concrete. Increasing crystallinity increases the compressive strength of the final product, whereby other properties of the aerated concrete are also affected positively, such as the shrinkage and relative moisture content.

Such additions of calcium sulfate carriers are mentioned in DE-OS 1646580. A process is described there in which the aerated concrete mixture has calcium sulfate added to it in a quantity of 32.5 wt %, calculated as $SO_3$, along with sand, fine white lime and cement. As a result of this, the compressive strength is allegedly increased significantly and the quantity of binder that is added (cement) is allegedly reduced. These calcium sulfates can be introduced in this way via a sulfate-rich cement, via a natural anhydrite, that is ground together with the cement, via fly ash or other suitable waste products, via anhydrite and/or gypsum or via dilute sulfuric acid.

A disadvantage of the use of calcium sulfates comprises the feature that, depending on the quantity of calcium sulfates that are added, agglomeration of the lime cement arises; hence, nonhomogeneous areas arise in the aerated concrete composition. This disadvantage exists particularly in the case of the soft calcined limes that are common today, so that one has to switch to the more expensive, harder, calcined limes.

A further disadvantage of the use of calcium sulfates comprises the marked retardation of the lime hydration that they cause; hence, the marked retardation of the foaming and setting process, whereby long standing times of the aerated concrete composition in the molds are associated with this.

The retardation of the lime hydration cannot be compensated by lime-rich recipes with anhydrite or a gypsum addition, since, in addition to their retarding action, the soluble calcium sulfates simultaneously lead to marked casting instability as a result of agglomeration.

In addition, a disadvantageous feature with the use of calcium sulfate, especially if use has to be made of hard calcined limes because of casting instability, is that, as a result of the retardation in the reaction, the lime is still hydrating even after cutting the aerated concrete cake to the final dimensions of the finished aerated concrete products. Since the volume of lime increases as a result of reaction with water, this expansion also leads to an expansion of the cut aerated concrete product. This expansion in volume is designated aftergrowth. Aerated concrete products that lie outside their very narrow dimensional tolerances as a result of this, can no longer be sold, and considerable costs are associated with this for the manufacturer.

The task of the invention is to create a process with which aerated concrete products can be achieved with high crystallinity and high compressive strength, whereby one avoids the agglomerations, retardation in the hydration reaction and aftergrowth that are caused by the sulfate carrier.

A further task of the invention comprises shortening the standing times of the aerated concrete cake from the time of casting up to the time of cutting, and to reduce the number of molds.

In this process, use is made of a calcium aluminate sulfate or a calcium aluminate sulfate hydrate as the sulfate component at least partially in place of calcium sulfate, whereby an example of an embodiment of an aerated concrete mixture in accordance with the process and in accordance with the invention can be seen in the following Table I, column III:

TABLE I

|  |  | I | II | III |
|---|---|---|---|---|
| Recipe | Quartz sand | 69.9M % | 68.9M % | 64.9M % |
|  | Quicklime | 15.0M % | 15.0M % | 15.0M % |
|  | Cement | 15.0M % | 15.0M % | 15.0M % |
|  | Anhydrite | 0M % | 2.0M % | 0M % |
|  | Ettringite | 0M % | 0M % | 6.0M % |
|  | Aluminum Powder | 0.1M % | 0.1M % | 0.1M % |
| Properties | Bulk Density | 450 kg/m$^3$ | 450 kg/m$^3$ | 450 kg/m$^3$ |
|  | Compressive Strength | 2.49 N/mm$^2$ | 2.75 N/mm$^2$ | 3.03 N/mm$^2$ |
|  | E-modulus | 700 N/mm$^2$ | 800 N/mm$^2$ | 1020 N/mm$^2$ |
|  | Shrinkage | 0.51 mm/m | 0.24 mm/m | 0.18 mm/m |
| Crystallinity 3.08 Å | Int[expansion unknown] tobermorite/int CaF$_2$ | 27 | 33 | 39 |

The meaning of "M %" is "percent by weight".

Surprisingly, it was possible to establish that such a sulfate component does not lead to any retardation in the lime hydration. As a result of this, shorter fermentation times are achieved, whereby the lime hydration can proceed sufficiently far during these short fermentation times that no injurious expansion. i.e. aftergrowth, of the aerated concrete products arises after cutting or during steam treatment in the autoclave.

Since the work cycle from casting to cutting the aerated concrete with green strength using the process in accordance with the invention can be reduced drastically from several hours before this to approximately 20 min, one is successful in considerably increasing the production quantities of an existing plant.

However, the situation is also made possible with the process in accordance with the invention that the number of molds; hence, the maintenance and servicing costs, can be reduced with unchanged production quantities in the case of existing production plants.

In addition, it is possible to operate small production plants economically with only one mold, whereby this mold can also be operated in a constant manner, for example. In order to be able to operate such a small production plant, mixtures had to be used until now that formed a foam and hardened rapidly since they scarcely contained any sulfate, but they could not attain the attributes of mixtures that contain sulfate in regard to properties such as compressive strength, relative moisture content or shrinkage.

Using the process in accordance with the invention, the situation is now made possible for the first time that aerated concrete products can be produced in an especially economical manner with the high quality and attributes of sulfate-containing mixtures in small production plants, and also in the smallest possible production plants, with only one mold.

In this way, it has been possible to establish that an aerated concrete recipe with an addition of ettringite behaves in exactly the same way as an aerated concrete recipe that does not contain any of the usual sulfate components. For example, an aerated concrete recipe with anhydrite as the sulfate addition achieves a maximum temperature of approximately 65° C. after 120 min, whereas aerated concrete recipes without a conventional addition of a sulfate carrier or with ettringite achieve their maximum temperature after 90 min.

Since—in the correct mixing ratio—calcium aluminum sulfates or their hydrates act in an accelerating manner on the cement, aerated concrete recipes can also be created in this way that achieve adequate maturity for cutting in very short times. For example: ettringite that has been dehydrated at approximately 200° C. acts especially advantageously.

The temperature profiles during the rigidification of experimental castings are qualitatively the same when using ettringite and without an addition of sulfate components.

As a result of the addition of calcium aluminum sulfates or their hydrates, it has also been found that agglomeration of the lime no longer occurs on mixing. As a result of this, the distribution of the lime in the aerated concrete mixture is ore homogeneous as a result of which the course of foaming and setting is also accelerated. In addition, it was possible to establish that the crystallization of the calcium silicate hydrates is influenced considerably by the addition of calcium aluminum sulfates. Surprisingly, a change in the crystals can be found in the final product in terms of their size, shape, number and distribution.

In this connection, in particular, the number of crystals is lower than when using conventional sulfate carriers, for example, gypsum. These crystals are formed well and regularly in this regard. In this connection, the crystals can be larger than when using conventional sulfate components, whereby, surprisingly, compressive strength values are nevertheless obtained that are least as high as the compressive strength values when using conventional sulfate components.

This can also be seen from Table I that is shown above. The properties of aerated concrete from different recipes are contrasted in the table. In this connection, column I shows an aerated concrete recipe without an addition of a sulfate components; column II shows an aerated concrete recipe with anhydrite as the sulfate components addition, and column III shows an aerated concrete recipe with ettringite as the sulfate carrier addition.

One can see from column II that 2.0 M % of anhydrite has been added. From column III, one can see than 6.0 M % of ettringite was added, whereby the quantities of sulfate were based on equal quantities of $SO_3$. The effective sulfate concentration in the case of both additions is thus essentially the same. In the case of compressive strength, a considerable increase results via addition of ettringite, whereby an increase can also be found in the evolution of the E modulus. In addition, lower shrinkage can be achieved, with advantage, using an aerated concrete recipe that contains ettringite instead of anhydrite; this also emerges from columns II and III of Table I. If one considers crystallinity, a distinct increase can also be established when using ettringite relative to the use of anhydrite.

Calcium aluminate sulfates or their hydrates that can be used in accordance with the process and in accordance with the invention are, for example, ettringite ($C_3A \cdot 3CS \cdot 32H$) or monosulfate ($C_3ACS \cdot 12H$), or mixtures thereof that can be produced using generally known processes for the production of ettringite. The formulas in parentheses correspond to the curtailed chemical nomenclature that is customary in cement chemistry ($C=CaO$; $A=Al_2O_3$; $S=SO_3$; $H=H_2O$).

In this connection, a possibility for the addition of the calcium aluminate sulfate comprises adding this to the sand prior to grinding and then grinding the mixture jointly with this. This takes place in an advantageous way at least with the calcium aluminate sulfates present in air-dried form, since in the case of grinding the mixture in an uncontrollable manner, the water of crystallization can be driven out. It is therefore advantageous to add the calcium aluminate sulfate in calcined form, i.e. dehydrated form. In this connection, an advantage of making the addition to the sand prior to grinding the mixture comprises the feature that the calcium aluminate sulfates or their hydrates are especially well distributed. This can also be achieved if the calcium aluminate sulfates are added to this in a separate mixing process after grinding the sand, whereby the sulfate components can then be used in hydrated form, too; this is especially advantageous since the sulfate components does not then influence the mixing with water of the aerated concrete composition as a result of its own hydration.

A further possibility for introducing the calcium aluminate sulfates or their hydrates into the aerated concrete mixture is to add them to the mixer. In this connection, the viscosity of the aerated concrete mixture can be influenced or adjusted in an advantageous way by the use of dehydrated calcium aluminate sulfate as a result of its high water absorption capacity. This adjustment can take place in an especially advantageous manner via a mixture comprising calcium aluminate sulfate and calcium aluminate sulfate hydrate.

Another possibility for adding calcium aluminate sulfate hydrates or calcium aluminate sulfates is to disperse these in water beforehand and then to add them to the mixture. As a result of this, especially good distribution of the calcium aluminate sulfate hydrates can also be achieved in the aerated concrete mixture. Such a suspension can also be produced in an advantageous manner by dissolving the calcium sulfates, e.g., gypsum, and suitable calcium aluminates, e.g., $C_3A$, in water. Ettringite is formed as a result of this, whereby the desired ettringite/gypsum ratio can be controlled in an advantageous manner here via the calcium aluminate addition in the case of replacing the calcium sulfates by calcium aluminum sulfates which is merely partially desired.

The invention creates a process which makes it possible to prepare aerated concrete with no agglomeration of the lime component, hydration retardation or aftergrowth, that is governed by the calcium sulfate, whereby the finished product has good crystallinity and good compressive strength.

As a result of the absence of agglomeration of the lime, the lime is more finely distributed in the aerated concrete mixture; as a result of this, its reactivity increases and the fermentation times become shorter. Shortening of the fermentation times is also achieved as a result of the aspect that the lime hydration is not retarded. As a result of the reduced fermentation times, production quantities can be increased considerably by shortening the cycle times without using additional molds.

The process in accordance with the invention also makes it possible, in an advantageous way, to operate small production units in an economical manner with few molds, or only one mold, and to obtain qualitatively high-grade products with a high compressive strength using the process in accordance with the invention in this way.

Since aftergrowth does not arise with these sulfate components either, cost savings also arise here to a considerable extent.

We claim:

1. In a process for the production of construction materials comprising aerated concrete made from a dry mixture of sand, quicklime, cement and a sulfate component together with water and at least one pore-forming agent, whereby the components are mixed and cast in molds, the improvement comprising:

adding to the dry mixture at least one of calcium aluminate sulfate or a calcium aluminate sulfate hydrate as the sulfate component before adding water to the dry mixture, so as to reduce hydration time in the mold without increasing expansion after removal from the mold.

2. Process in accordance with claim 1, wherein the calcium aluminate sulfate hydrate used is ettringite ($C_3A \cdot 3CS \cdot 32H$).

3. Process in accordance with claim 1, wherein the calcium aluminate sulfate hydrate used is a monosulfate ($C_3A \cdot CS \cdot 12H$).

4. Process in accordance with claim 1, wherein the sulfate component used is a mixture of ettringite and monosulfate.

5. Process in accordance with claim 1, wherein the calcium aluminate sulfate or calcium aluminate sulfate hydrate used are used in an air dry, dried or calcined form.

6. Process in accordance with claim 1, wherein the sulfate component is a mixture comprising calcium aluminate sulfates and calcium aluminate sulfate hydrates.

7. Process in accordance with claim 1, wherein the sulfate component is used in finely ground form.

8. Process in accordance with claim 1, wherein the sulfate component is dispersed and used in the form of a suspension.

9. Process in accordance with claim 1, wherein the sulfate component is mixed with the sand and then the mixture is ground.

10. Process in accordance with claim 1, wherein the sulfate component is ground and then is mixed with the sand, whereby the sulfate component is used in the form of a hydrate in air dry form.

11. Process in accordance with claim 1, wherein the sulfate component is dispersed in water and then it is added to the mixture.

12. Process in accordance with claim 1, wherein a mixture comprising calcium aluminate sulfates and calcium aluminate sulfate hydrates is added to the mixture so as to adjust the viscosity of the aerated concrete.

13. Process in accordance with claim 8, wherein the sulfate component is produced by concurrent mixing of water, calcium sulfate and calcium aluminates, whereby the calcium aluminate sulfate hydrate produced and residual water are added to the mixture.

14. Process in accordance with claim 8, wherein the sulfate component is produced by concurrent mixing of water, calcium sulfates and calcium aluminates, whereby the ratio of calcium sulfate hydrates to calcium aluminum sulfate hydrates is adjusted via the addition of calcium aluminates.

15. Process in accordance with claim 1, wherein a single mold is used for the production of the aerated concrete products.

16. Process in accordance with claim 12, wherein a single mold is used for the production of the aerated concrete products.

17. Process in accordance with claim 13, wherein a single mold is used for the production of the aerated concrete materials.

18. Process in accordance with claim 14, wherein a single mold is used for the production of aerated concrete materials.

19. Process in accordance with claim 1, wherein only one single mold is used for the production of aerated concrete materials, whereby the mold is arranged in a fixed manner in a production plant.

20. Process in accordance with claim 15, whereby the mold is arranged in a fixed manner in a production plant.

21. In a process for the production of construction materials comprising aerated concrete made from a dry mixture of sand, quicklime, cement and a sulfate component together with water and at least one pore-forming agent, whereby the components are mixed and cast in molds, the improvement comprising:

adding to the dry mixture at least one of a calcium aluminate sulfate or a calcium aluminate sulfate hydrate as the sulfate component before adding water to the dry mixture, so as to reduce hydration time in the mold without increasing expansion after removal from the mold; and wherein, the time from when the mold is filled with an aerated concrete cake to when said aerated concrete cake achieves green strength and is removed from the mold, is carried out in less than one hour.

22. Process in accordance with claim 19, wherein the time from when the mold is filled with an aerated concrete cake to when said aerated concrete cake achieves green strength and is removed from the mold, is carried out in less than one hour.

23. Process in accordance with claim 20, wherein the time from when the mold is filled with an aerated concrete cake to when said aerated concrete cake achieves green strength and is removed from the mold, is carried out in less than one hour.

24. Process in accordance with claim 21, wherein the one work cycle is carried out in 10–20 minutes.

25. Process in accordance with claim 23, wherein the one work cycle is carried out in 10–20 minutes.

* * * * *